US012598335B2

(12) United States Patent
Rivoalen et al.

(10) Patent No.: US 12,598,335 B2
(45) Date of Patent: Apr. 7, 2026

(54) METHOD FOR MANAGING PLAYBACK OF MULTIMEDIA CONTENT

(71) Applicant: ORANGE, Issy-les-Moulineaux (FR)

(72) Inventors: Mathieu Rivoalen, Chatillon Cedex (FR); Hervé Marchand, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/339,561

(22) Filed: Jun. 22, 2023

(65) Prior Publication Data

US 2023/0421821 A1      Dec. 28, 2023

(30) Foreign Application Priority Data

Jun. 24, 2022     (FR) ...................................... 2206324

(51) Int. Cl.
 *H04N 21/231* (2011.01)
 *H04N 21/234* (2011.01)
(52) U.S. Cl.
 CPC ..... *H04N 21/23103* (2013.01); *H04N 21/234* (2013.01)
(58) Field of Classification Search
 None
 See application file for complete search history.

(56) References Cited

U.S. PATENT DOCUMENTS 10,419,806 B1 * 9/2019 Nijim ................. H04N 21/2747
2009/0269027 A1 * 10/2009 Bedingfield, Sr. ...........................
                                       H04N 21/47202
                                       386/E5.005
2018/0343460 A1 11/2018 Lu

FOREIGN PATENT DOCUMENTS

WO         2007128194 A1    11/2007

OTHER PUBLICATIONS

French Search Report and Written Opinion dated Jan. 13, 2023 for corresponding French Application No. 2206324, filed Jun. 24, 2022.

* cited by examiner

*Primary Examiner* — Nicholas T Corbo
(74) *Attorney, Agent, or Firm* — David D. Brush; Westman, Champlin & Koehler, P.A.

(57)         ABSTRACT

A method for managing playback of multimedia content using a playback device equipped with a processor and capable of rendering the content. The playback device includes a plurality of selectable players capable of playing back the same content. The method includes: selecting a player from among the selectable players; and playing the content with the selected player.

11 Claims, 3 Drawing Sheets

[Fig 1]
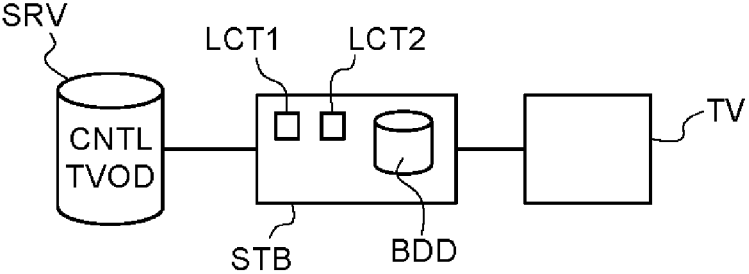
[Fig 2]
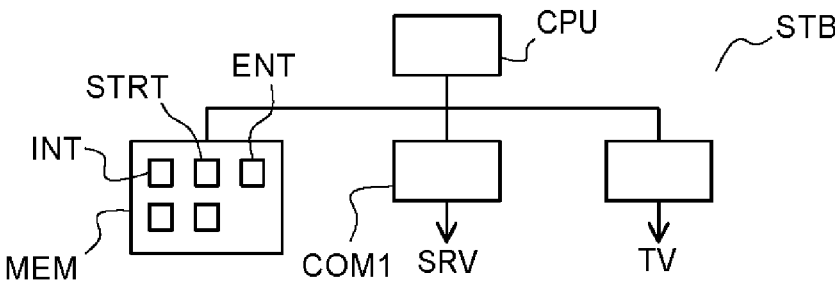
[Fig 3]
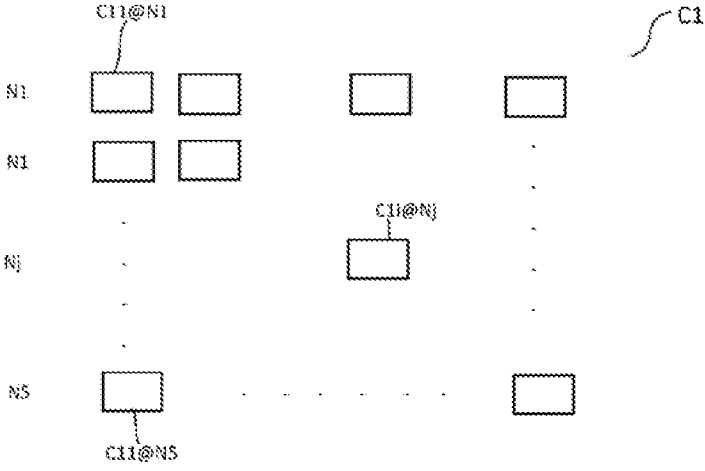

[Fig 4]
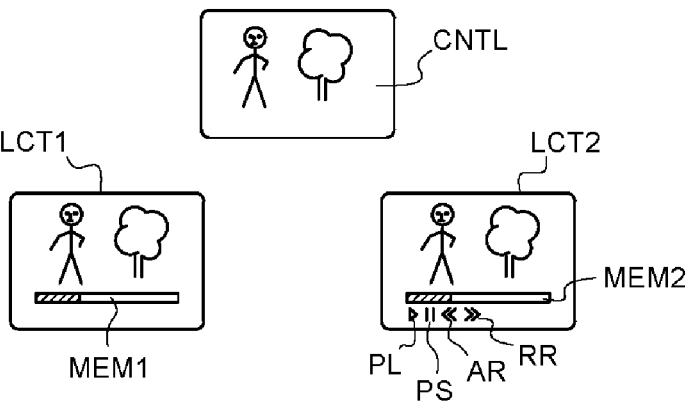
[Fig 5]
| PH$_1$ | PH$_2$ | PH$_3$ | BDD |
|---|---|---|---|
| CNTL | CNTL+STRT | TVOD | |
| LCT$_1$ | LCT$_2$ | LCT$_2$ | |
[Fig 6]
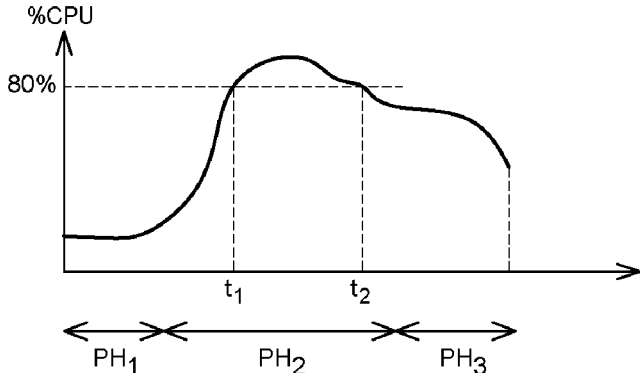

[Fig 7]
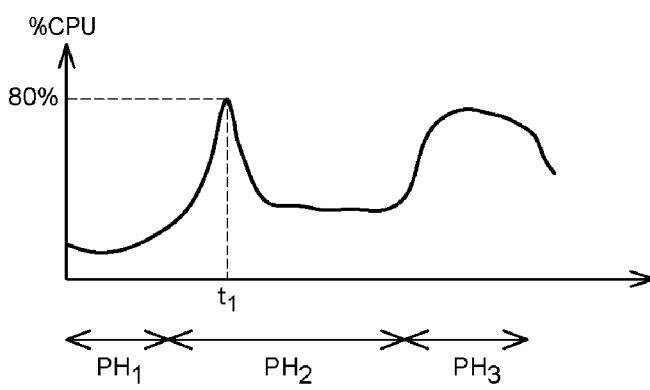

METHOD FOR MANAGING PLAYBACK OF MULTIMEDIA CONTENT

TECHNICAL FIELD

The field of the present disclosure is that of digital multimedia content, namely digital audio and/or video content, also called audiovisual content.

The disclosure particularly relates to a method for managing playback of multimedia content.

A playback device particularly relates to any device capable of receiving multimedia streams in the form of segments, for example, a decoder, a mobile phone, a tablet, etc., and of playing back the received content.

Content is, for example, content broadcast in real time, also called "live" content by a person skilled in the art, television-on-demand content, video-on-demand content, etc.

BACKGROUND OF THE DISCLOSURE

Currently, many audiovisual content playback devices exist that allow a user to access all kinds of multimedia content (video-on-demand (VOD), television-on-demand (TVOD), etc.). Playback devices are adapted to receive digital content in the form of multimedia data and to render it on a rendering device.

Several types of content players exist, each offering more or less commands (play, pause, fast rewind, fast forward, etc.) presented in the form of a menu. Due to the diversity of the commands that are available, a content player consumes more or less processor resources (or CPU resources).

Depending on the type of content to be played back and on the type of player, processor consumption can be excessive. For example, if the player comprises a menu with many functions, such as a function for fast forwarding/rewinding, pausing, rendering a thumbnail associated with a current playback time, etc., this can result in overloading of the CPU resources; and if, in addition, the video stream is rendered in the background relative to the menu, such a configuration results in a CPU load that is sometimes in the region of 90%. The result of this overconsumption is issues with rendering content (pixelation, slowing-down) and even interruption of the rendering, which is not at all acceptable in terms of quality of service.

An exemplary aspect of the present disclosure improves the situation.

SUMMARY

To this end, according to a functional aspect, the present disclosure relates to a method for managing playback of multimedia content using a playback device equipped with a processor and capable of rendering the content, characterized in that the playback device comprises a plurality of selectable players capable of playing back the same content, and in that it comprises the following steps:

b. a step of selecting a player from among the selectable players;

c. a step of playing the content with the selected player.

According to an exemplary aspect of the present disclosure, several players are available for selection. A player therefore can be carefully selected from all the available players. In other words, unlike the prior art where the player is selected once and for all, the type of content player used in the playback device varies over time. This possible selection between several players for playing content allows processor resources consumption to be managed and therefore avoids overloading this resource.

According to a first embodiment, the selection is based on the type of content to be played back. This first simple embodiment simply identifies the type of content (content broadcast in real time, video-on-demand, etc.) and selects the content with a suitable player, for example, a player offering commands adapted to the content to be played; if the content is on-demand content, the player will be selected from among the players offering, for example, a command for fast forwarding or fast rewinding the content.

According to a second embodiment, which can be implemented alternatively or cumulatively with the previous embodiments, the content player is selected as a function of an execution context related to playback of the content. This second embodiment takes into account a context for executing playback that is added to the playback. According to an alternative embodiment of the second embodiment, the execution context includes displaying a menu in addition to the content being rendered. The menu is superimposed on the rendering of the content; such a configuration consumes a lot of processor resources. By having several players available, each consuming more or less processor resources, this embodiment and the associated alternative embodiment allow the CPU load to be reduced.

In a third embodiment, which can be implemented alternatively or cumulatively with the previous embodiments, if several players are capable of playing the content, the player is selected from among the player consuming the least processor resources. The aim of this third embodiment is to reduce processor resources consumption so that it is available for computing tasks other than content playback.

According to a fourth embodiment, which can be implemented alternatively or cumulatively with the previous embodiments, the context includes activation of a playback function during playback of content; if the current player is not suitable, the method comprises the selection of another player. The purpose of this fourth embodiment is for a case whereby, during playback of content, a playback function is activated and a player other than the current player is more suitable for playback. This embodiment ensures optimum selection of a player even when playing back the content.

According to a fifth embodiment, which can be implemented alternatively or cumulatively with the previous embodiments, the execution context is linked to the amount of use of the processor resources; the current player is replaced by another player if the amount of use of the processor resources reaches a fixed value. This fifth embodiment is interesting in that it allows CPU consumption to be controlled, particularly when the selected player consumes too much CPU power.

According to a hardware aspect, the disclosure relates to an entity for managing playback of multimedia content using a playback device equipped with a processor and capable of rendering the content, characterized in that the playback device comprises a plurality of selectable players capable of playing back the same content, and in that the processor carries out the following steps:

a. a step of selecting a player from among the selectable players;

b. a step of playing the content with the selected player.

According to another hardware aspect, the disclosure relates to a decoder comprising a management entity as defined above.

According to another hardware aspect, the disclosure relates to a computer program capable of being implemented on an entity as defined above, the program comprising code instructions which, when executed by a processor, carry out the steps of the selection method defined above.

Finally, according to another hardware aspect, the disclosure relates to a data medium, on which at least one series of program code instructions for executing a management process as defined above has been stored.

Such a storage medium can be any entity or device capable of storing the program. For example, the medium can comprise a storage means, such as a ROM, for example, a CD-ROM or a microelectronic circuit ROM, or even a magnetic recording medium, for example, a USB key or a hard disk.

Moreover, such a recording medium can be a transmissible medium such as an electrical or optical signal, which can be routed via an electrical or optical cable, by radio or by other means, so that the computer program it contains can be executed remotely. The program according to an exemplary aspect of the disclosure particularly can be downloaded from a network, for example, the Internet.

Alternatively, the recording medium can be an integrated circuit, in which the program is incorporated, with the circuit being adapted to execute or to be used to execute the aforementioned display control method.

BRIEF DESCRIPTION OF THE DRAWINGS

One or more aspects of the present disclosure will be better understood upon reading the following description, which is provided by way of an example and with reference to the accompanying drawings, in which:

FIG. 1 shows a computer system on which an embodiment of the disclosure is illustrated;

FIG. 2 is a simplified synoptic diagram of the hardware structure of the playback device;

FIG. 3 illustrates content comprising segments with which several encoding rates are respectively associated;

FIG. 4 illustrates the rendering of menus associated with two separate players;

FIG. 5 illustrates a correspondence table stored in a database allowing the management entity to select a player as a function of the content to be played and the execution context;

FIG. 6 illustrates the evolution of processor resources consumption during several playing phases;

FIG. 7 illustrates an embodiment in which the current operating state of the processor resources is taken into account in order to determine whether or not to implement the management method.

DETAILED DESCRIPTION OF ILLUSTRATIVE EMBODIMENTS

Reference will now be made to FIG. 1, which shows a progressive download architecture based on the use of HAS adaptive streaming according to one embodiment of the disclosure. Again, it should be noted that the present disclosure is not limited to HAS technology, but extends to all other data downloading technologies.

The computer system SYS comprises a device STB for playing multimedia streams, for example, a decoder connected to a rendering terminal TV such as a rendering device. It should be noted in this case that the decoder playback device STB and the rendering device can form one and the same item of equipment.

In this example, the playback device STB is connected to a port of the rendering device TV. In this example, the playback device STB is located in an LAN controlled by a home gateway (not shown in the figures). The context of the local network is provided by way of an example and easily could be transposed to a "best effort" type Internet network, a company network, etc.

The gateway is capable of communicating via a telecommunications network such as a WAN known to a person skilled in the art.

In this example, a digital content server SRV is located in the WAN. The content server SRV receives, for example, strings of digital television content CNTL, called "Live" content by a person skilled in the art, originating from a broadcast television network (not shown), and/or videos-on-demand TVOD, and makes them available to client terminals, in this case the playback device STB.

In this example, the decoder playback device STB is a client. It is common, within this client-server context, for an adaptive streaming technique, abbreviated to HAS, based on the HTTP protocol, to be used to exchange the data between the client terminal STB and the content server SRV. This type of technique notably allows the user to be offered good quality content, while taking into account the variations in bandwidth that can occur on the link between the client terminal STB and the services gateway, and/or between the services gateway and the content server SRV.

FIG. 2 shows an architecture of a playback device STB. This device STB conventionally comprises memories MEM associated with a processor CPU. The memories can be ROM (Read Only Memory), RAM (Random Access Memory) or even Flash type memories.

The decoder STB comprises a buffer memory, also called a cache memory by a person skilled in the art.

The decoder STB can transmit content to be rendered to the rendering device TV via a communication module COM2. This module COM2 is an HDMI link, for example.

The decoder STB communicates with the gateway via an Ethernet module for local wired communication or via a Wi-Fi type radio module for local wireless communication with the residential gateway GTW. The module in question is referred to as COM1 in FIG. 2.

The decoder STB comprises a download module capable of managing downloading in adaptive streaming mode and therefore capable of requesting progressive downloading of any of the content at one of the qualities proposed in a description file.

The description file can be downloaded and stored, for example, in the memories MEM of the decoder STB or can be located outside the decoder STB.

The decoder STB further comprises a management unit ENT, the function of which will be explained hereafter. In this example, the download module is included in the management entity ENT.

The decoder STB can also contain other modules such as a hard disk (not shown) for storing video segments, a module for controlling access to content, a module for processing commands received from the smartphone, etc.

Typically, as will be seen with reference to FIG. 3, various qualities can be encoded for the same content of a string, corresponding to various encoding rates, for example. More generally, the term 'quality' is used to refer to a certain resolution of the digital content (spatial or temporal resolution, quality level associated with video and/or audio compression) at a certain encoding rate. Each quality level is itself divided into time segments on the content server (or content "segments", or "chunks", with these three terms being used interchangeably throughout this document).

The description of these various qualities and the associated temporal segmentation, as well as the content segments, is accessible by the playback device STB and made available thereto via their Internet addresses. The Internet addresses identify segments on a network. Such an address can be a URI (Universal Resource Identifier) type identifier known to a person skilled in the art. All these parameters (qualities, segment addresses, etc.) are generally consolidated in a parameter file, called description file or "MNF description file". It should be noted that this parameter file can be a computer file or a set of descriptive information of the content, accessible at a certain address.

Within the context of progressive adaptive downloading, the playback device STB can adapt its requests to receive and decode the content requested by the user at the quality that best corresponds to them. For example, if content is considered to be available at the following three qualities: 1 Mb/s (megabits per second), 1.95 Mb/s (N2), and 3 Mb/s (N3), it is also assumed that the playback device STB has a bandwidth of 5 Mb/s on the link LI1 (between the gateway and the server). In this configuration, the playback device STB can request content at any rate below this limit, for example, 3 Mb/s.

In general, with reference to FIG. 3, content number i with quality Nj (for example, the j-th quality level Nj described in the description file) is denoted "Ci©NJ".

The number of encoding rates available per segment varies according to the playback device used. In FIG. 3, for example, a main content C1 has five available encoding rates N1-N5.

Further details will not be provided concerning the adaptive streaming download technique, as this is not relevant to the present disclosure.

In this example, the system further comprises an encoder and a description file generator, which are also not shown because they are not relevant to the present disclosure. The role of the encoder is to encode digital content in order to acquire several segments and several representations for each segment.

The encoded content is sent to the description file generator, which generates URI addresses for each created segment.

In the example shown, the encoder and the description file generator are installed in the server SRV.

In this example, the playback device STB is a client terminal and as such can start communicating with the content server SRV in order to receive one or more items of content (films, documentaries, advertising sequences, etc.).

In this example, in order to view an item of content, the playback device STB acquires an address from the description file MF of a desired main item of content (for example, C1). Hereafter, it will be assumed that this file is a file of the description file type according to the MPEG-DASH standard and, depending on the context, the expression "description file" or "manifest" will be used interchangeably.

Once the playback device STB has the addresses of the segments corresponding to the desired content, the playback device STB proceeds with the acquisition of the segments by downloading from these addresses. It should be noted that this downloading is conventionally carried out in this case via an HTTP URL, but also could be carried out via a universal address (URI) describing another protocol (dvb:// monsegmentdecontenu, for example).

When the decoder STB receives the segments, the segments are then rendered on the screen of the rendering device TV.

The intended digital content is any content, namely the content of a television programme broadcast in real time, Live content CNTL, or a video-on-demand, or a personal video of the user, or any other equivalent multimedia content.

Live content is a television show, for example.

The content server SRV stores the various content in the form of segments. More specifically, the HAS content server displays a video C1 in the form of segments or "chunks" C1i@Nj encoded at different encoding rates Nj, where the index i designates a time identifier of the "chunk" C1i@Nj as explained above.

The management entity ENT of the decoder STB is responsible for gathering segments from the HAS content server by selecting the video quality Nj as a function of the available network resources, in this case the bandwidth. The way the management entity ENT selects the encoding rate of the next video segment to be downloaded is not described in further detail herein.

The management entity ENT present on the playback device STB controls the downloading of a segment with an optimal encoding rate as described in further detail hereafter.

Initially, the management entity ENT retrieves the description file MNF that corresponds to the video content C1 in order to discover the available segments of the video content C1, and the associated different video qualities (or encoding rates) Nj. In the example shown in FIG. 3, the main content C1 is proposed, for example, in the form of segments with a duration of 2 s, with a first encoding rate N1=1 Mb/s, a second encoding rate N2=1.95 Mb/s, a third encoding rate N3=3 Mb/s, a fourth encoding rate N3=5 Mb/s, etc.

In a normal operating mode, the downloading entity downloads, for example, successive segments C11@N1 (that is, the first time segment at an encoding rate of 1 Mb/s), then C12@N2 (that is, the second time segment at an encoding rate of 1.95b/s), then C13@N3 (that is, the third time segment at an encoding rate of 3 Mb/s), etc.

According to an aspect of the present disclosure, a further function of the management entity is to playback the content by means of a player. According to an aspect of the present disclosure, the management entity ENT has several reading modules LCT1 and LCT2, called players hereafter. More specifically, the playback device, implying the management entity ENT, carries out the following steps:

a. a step of selecting content;
    b. a step of selecting a player from among the available players.

Players offer specific functions for playing content. The example used herein will be based on two players LCT1/LCT2 in order to simplify the disclosure. Of course, the number of players can be greater.

FIG. 4 shows a view of the menus MEN1/MEN2 associated with the two players LCT1/LCT2, respectively.

In this example, a first basic player LCT1 provides a menu MEN1 simply displaying a time axis AX, on which a first duration appears that represents the completed playback time and a second duration that represents the duration remaining to playback until the end of the content.

In this example, a second player LCT2 provides a menu MEN2 that also comprises a time axis AX as for the first player, and other functions, namely:

a button PL for starting playback if it has stopped;
    a pause button PS;
    a fast forward/rewind button AR/RR;
    a display of an image associated with the current playback time.

In this example, it is assumed that the second player LCT2, when it is executed, consumes more processor resources than the first player LCT1.

In this example, the menus are superimposed on the content CNTL, as shown in FIG. 4. This figure shows:

content CNTL rendered without a menu; and content with the first menu MEN1, with the menu being rendered in the foreground and the content in the background;

content with the second menu MEN2, with the menu also being rendered in the foreground and the content in the background.

According to an aspect of the present disclosure, the management entity ENT manages the selection of the player LCT1/LCT2 for playing content CNT. The selection of the player to be used will depend, for example, on a type of content to be played back and/or on an execution context linked to playing content.

For example, the entity ENT selects a player as a function of the type of content to be played back; if the content is Live content CNTL, a minimalist player will be used, in this case the first player LCT1; however, if the content is recorded content or TVOD on-demand content, the selected player will include more functions such as a fast forward/rewind function, a pause function, an image display function for showing the current playback time, etc., in this case the second player LCT2.

One embodiment is described with reference to FIG. 5.

During a first step, the playback device STB requests access to Live content, for example, in adaptive streaming mode as described above.

In this example, an entity ENT determines the type of content and selects a suitable player for playing this type of content.

The appropriate player can be determined by consulting a database BDD, described hereafter with reference to FIG. 5, which stores matches between types of content and types of players to be used.

FIG. 5 illustrates several phases PH1-PH3, during which the selection entity ENT consults the database BDD in order to determine the player to be selected for playing the content.

In this example, the database BDD provides the following matches:

Live stream->first player LCT1;

Live stream CNTL+restart from the start STRT->second player LCT2;

TVOD stream->second player LCT2.

During a first phase PH1, the management entity ENT identifies the type of selected content CNTL. The management entity ENT consults the database BDD and selects the first player LCT1.

During a second phase PH2, which follows the first phase PH1, the user activates the function for restarting from the start STRT; in this case, the management entity ENT selects the second player LCT2 instead of the first player LCT1. This second player can be used to rewind RR or fast forward AR in the content, which the first player LCT1 cannot do.

During a third phase PH3, which follows the second phase PH2, TVOD on-demand content is selected. The management entity ENT consults the database BDD and selects the corresponding player, namely the second player LCT2. The TVOD content is played using the second player LCT2.

During each phase, the playback device downloads the segments as described above.

FIG. 6 illustrates the consumption of processor resources as a function of time during each phase PH1-PH3.

The curve shows that between two times t1 and t2 the CPU load exceeds 80%.

According to one embodiment, the first player LCT1, which consumes less CPU load, is selected automatically if the current processor resources consumption reaches a fixed value. For example, with reference to FIG. 7, it is assumed that the maximum percentage value of processor resources consumption is fixed at 80%. In this configuration, if this value is reached, the management entity ENT automatically selects the player that consumes the least amount of processor resources, namely the first player LCT1 in this example. Between these two instants, the management entity ENT therefore plays with the first player LCT1. This embodiment clearly shows that the possibility of changing player allows the consumption of processor resources to be controlled.

Finally, it should be noted herein that the term "module" or the term "entity" can correspond to a software component as well as to a hardware component or a set of hardware and software components, with a software component itself corresponding to one or more computer programs or sub-programs or, more generally, to any element of a program capable of implementing a function or a set of functions as described for the related modules. Similarly, a hardware component corresponds to any element of a hardware assembly capable of implementing a function or a set of functions for the relevant module (integrated circuit, smart card, memory card, etc.).

Although the present disclosure has been described with reference to one or more examples, workers skilled in the art will recognize that changes may be made in form and detail without departing from the scope of the disclosure and/or the appended claims.

What is claimed is:

1. A management method comprising:
managing playback of multimedia content using a playback device equipped with a processor and capable of rendering the content, wherein the playback device comprises a plurality of selectable players capable of playing back the same content, the selectable players including respective subsets of commands, and wherein the managing comprises:
selecting a player from among the selectable players;
playing the content with the selected player; and
during the playing of the content, varying the selected player over the time for the same content as a function of processor load in order to offer a given subset of the respective subsets of commands.

2. The management method according to claim 1, wherein the selecting is based on a type of the content to be played.

3. The management method according to claim 1, wherein the player is selected as a function of an execution context related to playback of the content.

4. The management method according to claim 3, wherein the execution context includes displaying a menu in addition to the content being rendered.

5. The management method according to claim 1, wherein, the selected player is selected from among the player consuming the least resources of the processor.

6. The management method according to claim 3, wherein the context includes activation of a playback function during playback of content, and wherein, if a currently selected player of the plurality of selectable players is not suitable, the method comprises selecting another player.

7. The management method according to claim 3, wherein the execution context is linked to an amount of use of resources of the processor and wherein a currently selected player of the plurality of selectable players is replaced by another player if the amount of use of the processor resources reaches a fixed value.

8. A management device for managing playback of multimedia content using a playback device capable of rendering the content, wherein the playback device comprises a plurality of selectable players capable of playing back the same content, the selectable players including respective subsets of commands, and wherein the management device comprises:

a processor; and a non-transitory computer readable medium comprising instructions stored thereon which when executed by the processor configure the management device to manage the playback by:

selecting a player from among the selectable players;

playing the content with the selected player; and during the playing of the content, varying the selected player over the time for the same content as a function of processor load in order to offer a given subset of the respective subsets of commands.

9. A decoder comprising the management device as defined in claim 8.

10. The management device according to claim 8, wherein the management device is implemented in the playback device.

11. A non-transitory computer readable data medium, on which at least one series of program code instructions is stored for executing a method for managing playback of multimedia content when the instructions are executed by processor of a playback device capable of rendering the content, wherein the playback device comprises a plurality of selectable players capable of playing back the same content, the selectable players including respective subsets of commands, and wherein the managing comprises:

selecting a player from among the selectable players;

playing the content with the selected player; and during the playing of the content, varying the selected player over the time for the same content in order to offer a given subset of the respective subsets of commands.

\* \* \* \* \*